Dec. 6, 1966 M. JACOBY 3,290,692

MAGNETIC STORAGE DISC AND DRUM

Filed Aug. 7, 1962

INVENTOR
MARVIN JACOBY

BY Edward M. Hassell

ATTORNEY

United States Patent Office 3,290,692
Patented Dec. 6, 1966

3,290,692
MAGNETIC STORAGE DISC AND DRUM
Marvin Jacoby, Fort Washington, Pa., assignor to Sperry Rand Corporation, New York, N.Y., a corporation of Delaware
Filed Aug. 7, 1962, Ser. No. 215,325
10 Claims. (Cl. 346—74)

This invention relates to information storage devices and more particularly to magnetic storage drums and discs.

The practice of magnetic recording on the periphery of a drum is well known, particularly in the computer art. The periphery of a cylindrical drum is provided with a coating of magnetizable material. One or more magnetic transducers are mounted in close proximity to the periphery of the drum. The drum is rotated about its axis exposing its coating to the magnetic field of the transducers during a writing operation. Each transducer creates in the coating a circular line or track of spots of remanent magnetism, each spot representing a bit of information. During a reading operating the transducers pick up the information recorded on the drum.

The practice of magnetic recording on a disc is the same as described above for a drum. This practice is, for example, well known in the computer art where disc memories are used comprising a number of discs covered on one or both sides with a magnetizable coating. The discs are rotated about their axis while exposing their sides to transducers in radial scanning motion with respect to the discs.

Magnetic drums may be made of metal, for example, of copper-base alloys. More recently drums have been made of non-metallic, very light weight material, such as card board.

The clearance between the transducer and the recording surface of both drum and disc must be very small in order to obtain an efficient magnetic coupling between the spots of remanent magnetism and the transducer. The clearance is very critical so that the recording surface must be extremely smooth (within 5 microinches) before the thin coating of magetizable material may be applied.

The severe requirement of smoothness of the recording surface involves expensive operations of precision machining, polishing, lapping and final balancing in order that the drum may provide satisfactory and reliable service.

It is an object of the invention to provide a magnetic record carrier and the method of making it, having a recording surface suitable for magnetic recording, obtained without the aid of expensive machining operations.

It is a further object of the invention to provide an improved very light weight magnetic record carrier and the method of making it, its recording surface proper being sealed hygroscopically.

According to the invention, the recording surface of a record carrier is covered by a sheath of thin shrinkable material shrunk onto the drum. To the tight surface thus obtained, there is applied the coating of magnetizable material.

Further objects and advantages of the invention will be apparent to those skilled in the art from the following description and the accompanying drawing in which.

Figure 1:
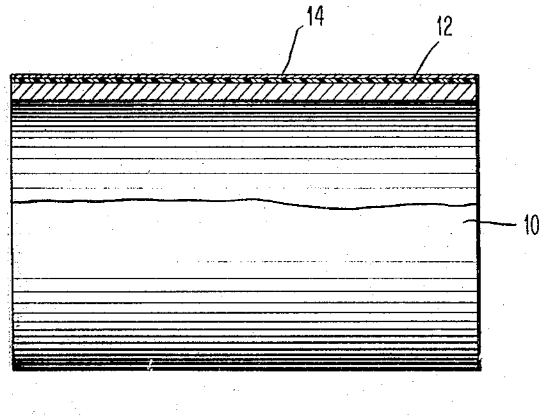
FIG. 1 illustrates a magnetic drum according to the invention.

Referring particularly to FIG. 1 of the drawing, a hollow cylinder 10 which is to constitute the recording cylinder proper of a magnetic drum, is illustrated surrounded by a sheath 12. The drum may be made of metal or of another material, for example, a light weight non-metallic material such as card board. The sheath 12 may be made of a synthetic resin, for example, vinyl in a preferred embodiment of the present invention. However, the sheath 12 could also be a thin shrinkable metal foil or other similar type material. The sheath 12 serves as a substrate for the coating 14 of magnetizable material.

The magnetic drum as illustrated and described is made as follows. The outer periphery of cylinder 10 is given a reasonably smooth surface by means of conventional machining operations, such as grinding and polishing. Subsequently, the sheath 12 is slipped over the cylinder.

The sheath 12 is, in one particular application, of the kind which is called prestressed vinyl. Prestressed vinyl material, be it in the form of foil or of a circular sheath, may be obtained by stretching the material to larger dimensions while being heated and allowing it to cool while under stress. In this way the interior stresses are preserved in the material. Such prestressed material will, upon re-heating, regain its original dimensions. Another method of making prestressed vinyl material is to have the material absorb a fluid suitable for the purpose, for example tuluene. As a result of the fluid absorption, the material swells and assumes larger dimensions. Upon subsequent application of heat to the material the absorbed fluid is evaporated and the material regains its original dimensions.

It will be understood that the sheath 12, surrounding the cylinder 10, prestressed by either method, and having a diameter slightly larger than the outer diameter of the cylinder 10, will upon heating, shrink onto the cylinder periphery. The sheath 12, tightly surrounding the cylinder 10, has an extremely smooth surface. The smoothness of the surface thus obtained is well within the narrow limits of five microinches. This degree of smoothness could be attained by conventional machining methods only through a time consuming and elaborate series of costly precision operations. The coating 14 of magnetizable material may be directly applied to the outer periphery of the sheath 12, according to methods well known to those skilled in the art.

Figure 2:
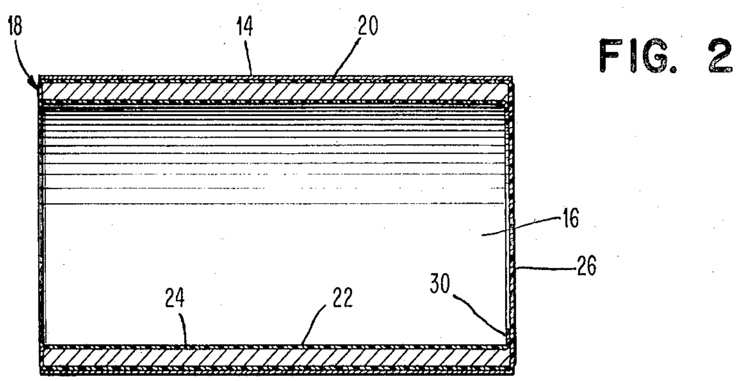
FIG. 2 illustrates another embodiment of a magnetic drum according to the invention.

Referring now particularly to FIG. 2, a cylinder 16, which is to constitute the recording cylinder of a magnetic drum, is sealed in an envelope 18 which covers both the inner and the outer periphery of the cylinder 16. The envelope is made of a synthetic resin such as vinyl. The portion 20 of the envelope which extends along the outer periphery of the cylinder is shrunk thereunto. The portion 22 of the envelope extending along the inner periphery of the cylinder adheres thereto by means of a layer of cement 24.

Figures 3, 6:
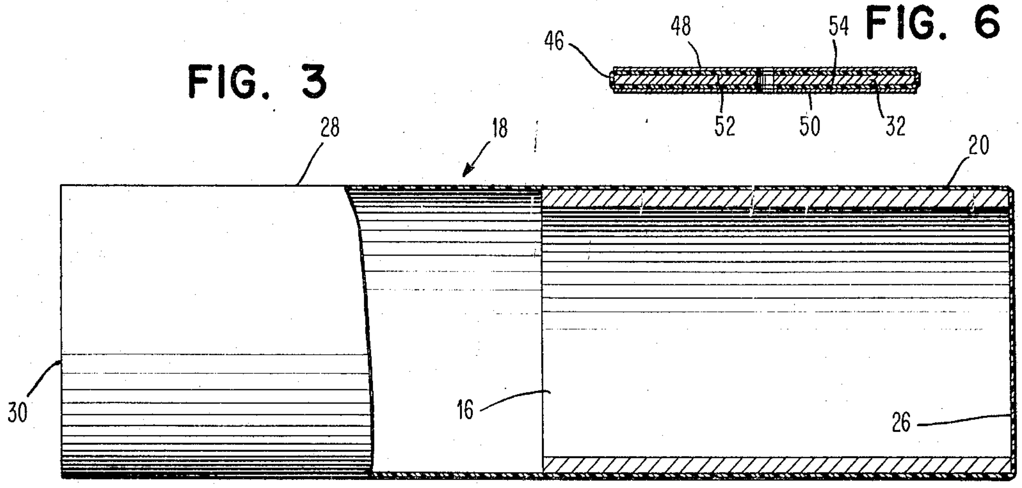
FIG. 3 illustrates a stage during the manufacture of the magnetic drum illustrated in FIG. 2.
FIG. 6 illustrates a diametrical cross-section of another embodiment of a magnetic disc according to the invention.

For the description of the method of manufacture of the magnetic drum according to FIG. 2, reference is made to FIG. 3. The envelope 18 is slipped over the cylinder 16 such that the bottom 26 of the envelope covers one face of the cylinder. The envelope is made of a prestressed material as discussed before for the drum of FIG. 1. The envelope 18 has a diameter somewhat greater than the outer diameter of the cylinder 16, and a length somewhat greater than two times the length of the cylinder. FIG. 3 illustrates this stage of manufacture. The open portion 28 of the envelope extends freely beyond the cylinder.

The portion 20 of the envelope which extends along the outer periphery of the cylinder is shrunk thereonto by the application of heat. After the shrinking operation is completed, a thin layer of a suitable adhesive is applied to the inner periphery of the cylinder 16. Subsequently, the open portion 28 of the envelope is returned through the interior of the cylinder and toward the bottom 26 of the envelope. The portion 28 of the envelope is spread over the inner periphery of the cylinder so that it adheres thereto by means of the applied adhesive. By means of a suitable welding operation, well known in the field of plastics, the free end 30 of the envelope is welded to the bottom 26 (FIG. 2). The coating of magnetizable material is applied in a conventional way, for example by means of plating or spraying.

In the finished drum of FIG. 2, manufactured according to the invention, two important results have been obtained. First, a magnetic storage drum is provided having an extremely smooth recording surface, which surface is obtained without any expensive and elaborate machining operation. Secondly, the recording drum is sealed efficiently from the surrounding atmosphere so that moisture contained therein cannot affect the recording drum and thereby influence its critical dimensions. It will be understood that such a complete sealing is important when the recording cylinder is made of a hygroscopic material, such as cardboard, since the absorption of moisture results in dimensional changes.

Figure 4:
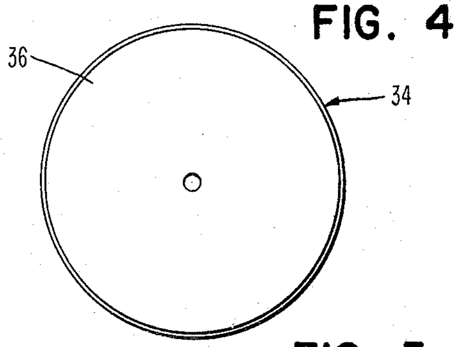
FIG. 4 illustrates a magnetic record disc according to the invention.
Figure 5:
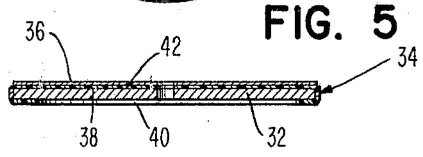
FIG. 5 illustrates a diametrical cross-section of FIG. 4.

FIGS. 4 and 5 illustrate a magnetic record disc according to the invention. The disc 32 may be made of metal or of another material, for example, a light weight non-metallic material such as cardboard. The disc 32 is provided with a cover 34 of a synthetic resin, for example, vinyl or other similar type material. The cover 34 serves as a substrate for the coating 36 of magnetizable material.

The magnetic record disc as illustrated and described is made as follows. The recording surface 38 of disc 32 is made reasonably smooth by means of conventional machining operations, such as grinding and polishing. Subsequently, the cover 34 is applied to the disc.

The cover is made of a prestressed material as discussed above for the drum of FIG. 1. The cover 34 has an extending peripheral portion 40 which may be folded over the periphery of the disc 32. The portion 42 of the cover 32 which extends over the recording surface 38 of the disc is shrunk thereunto by the application of heat. After the shrinking operation is completed, the coating 36 of magnetizable material may be directly applied to the cover 34 according to methods well known to those skilled in the art.

FIG. 6 illustrates a magnetic record disc surrounded by a complete wrap 46. The wrap 46 which is made of a suitable synthetic resin material, such as vinyl, serves as a substrate for the magnetizable coating 48 on one side of the disc 32 and for the magnetizable coating 50 on the other side of the disc.

A suitable method for manufacturing the record disc of FIG. 6 is, for example, as follows. The recording surfaces 52 and 54 of disc 32 are made reasonably smooth by means of conventional operations, such as grinding and polishing. Subsequently, two circular sheets are placed on both sides of the disc 32. Both sheets are made of a prestressed material as discussed above for the drum of FIG. 1. The diameter of the sheets is somewhat larger than the diameter of the disc. The rim portion of both sheets extending over the rim of disc 32 are welded together, for example, by means of high frequency welding. Subsequently, when heat is applied to the wrap 46 thus obtained, the wrap shrinks onto the disc. The coatings 48 and 50 of magnetizable material may be applied in a conventional way.

While there have been shown and described the fundamental novel features of the invention as applied to a preferred embodiment, modifications within the scope of the invention will be apparent to those skilled in the art. More specifically, the foil of thin shrinkable material need not be made of a synthetic resin, but parts of other material may be used, for example, metal foil or foil of another suitable material.

The embodiments of the invention in which an exclusive property or privilege is claimed are defined as follows:

1. A magnetic drum comprising:
   (a) a hollow cylindrical body;
   (b) a thin shrinkable element tightly surrounding the periphery of said cylindrical body, and
   (c) a magnetic coating on said element to receive magnetic recordings.

2. The invention as set forth in claim 1 wherein said cylindrical body is made of cardboard.

3. A magnetic record disc comprising:
   (a) a disc,
   (b) a thin shrinkable element surrounding said disc,
   (c) a magnetic coating on said element to receive magnetic recordings.

4. The invention as set forth in claim 3 wherein said element is made of a synthetic resin.

5. A magnetic storage device of the drum type comprising:
   (a) a hollow cylindrical body,
   (b) an envelope of a synthetic resin tightly surrounding the outer periphery of said cylindrical body and covering the inner periphery of said cylindrical body,
   (c) a magnetic coating on the portion of said envelope extending along the outer periphery to receive magnetic recordings.

6. The method of manufacturing a magnetic drum comprising the steps:
   (a) of placing an envelope of a prestressed synthetic resin over said drum,
   (b) applying heat to the envelope causing it to shrink in dimensions and thereby tightly surround the outer periphery of the drum, and
   (c) applying a coating of a magnetizable material to the outer periphery of said envelope.

7. The method of manufacturing a magnetic drum comprising the steps:
   (a) of placing an envelope of a prestressed synethetic resin over said drum,
   (b) said envelope being of substantially cylindrical form and of a diameter slightly greater than the diameter of the drum,
   (c) applying heat to the envelope causing it to shrink in dimensions and thereby tightly surround the outer periphery of the drum, and
   (d) applying a coating of a magnetizable material to the outer periphery of said envelope.

8. The method of manufacturing a magnetic drum comprising the steps:
   (a) of applying a coating of adhesive material to the inner periphery of said drum,
   (b) placing an envelope of a prestressed synthetic resin over the drum,
   (c) said envelope having a bottom,
   (d) said envelope being of substantially cylindrical form and of a diameter slightly greater than the diameter of the drum and of a length somewhat greater than two times the length of said drum,
   (e) applying heat to the portion of said envelope extending along the outer periphery of said drum thereby causing it to shrink to thereby tightly surround the outer periphery of said drum,
   (f) returning the open end of said envelope toward said bottom,
   (g) spreading said portion of said envelope against the inner periphery of said drum causing it to adhere, and
   (h) and welding the open end of said envelope to the bottom of said envelope.

9. The method of manufacturing a magnetic record disc comprising the steps:

(a) of placing a cover of a prestressed synthetic resin on the main body of said disc, (b) said cover having a fold over portion surrounding the rim of said disc, (c) applying heat to the cover causing it to shrink in dimensions and thereby tightly fit said main body, and (d) applying a coating of a magnetizable material to said cover.

10. The method of manufacturing a magnetic record disc comprising the steps:

(a) of placing said disc between two circular sheets of a prestressed synthetic resin, (b) welding the peripheral portions of said sheets together, (c) applying heat to said sheets causing them to shrink in dimensions and thereby tightly surround said disc, and (d) applying a coating of a magnetizable material to said sheets.

References Cited by the Examiner

UNITED STATES PATENTS

| | | | |
|---|---|---|---|
| 2,821,155 | 1/1958 | Seckel. | |
| 3,130,110 | 4/1964 | Schmidt | 346—135 |

TERRELL W. FEARS, *Acting Primary Examiner.*

A. I. NEUSTADT, *Assistant Examiner.*